(No Model.) 3 Sheets—Sheet 2.

D. HORN.
VELOCIPEDE.

No. 373,980. Patented Nov. 29, 1887.

WITNESSES:
J. D. Garfield
C. Sedgwick

INVENTOR:
D. Horn
BY Munn & Co.
ATTORNEYS.

(No Model.)  
D. HORN.  
VELOCIPEDE.  
3 Sheets—Sheet 3.
No. 373,980. Patented Nov. 29, 1887.
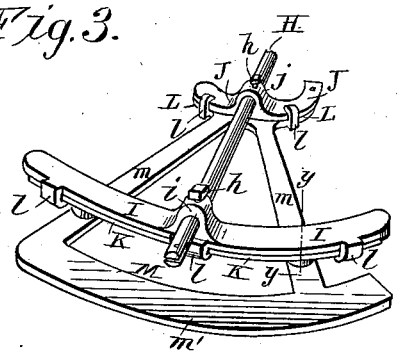
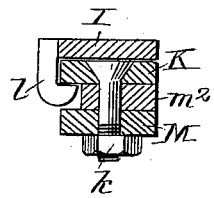
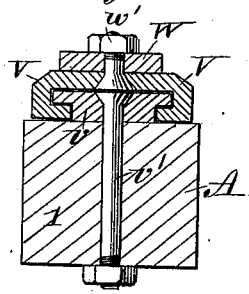
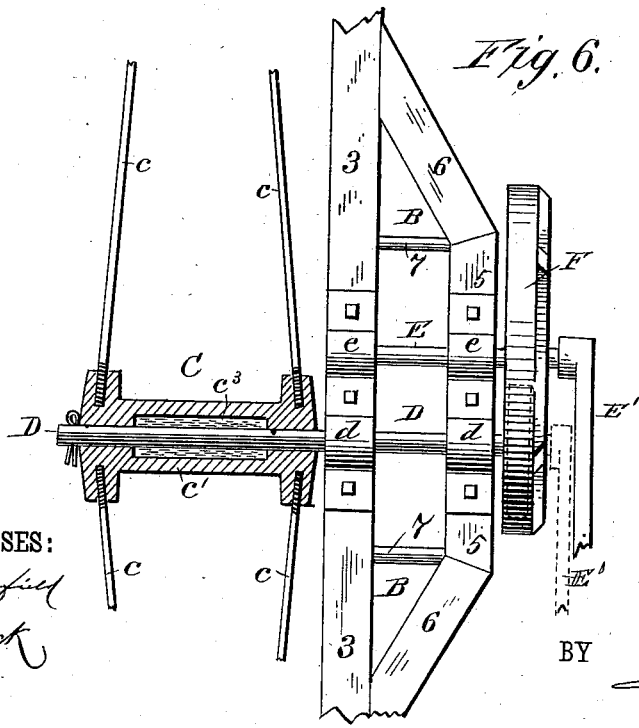
WITNESSES:
J. N. Garfield
C. Sedgwick
INVENTOR:
D. Horn
BY Munn & Co.
ATTORNEYS.

UNITED STATES PATENT OFFICE.

DAVID HORN, OF CARTERVILLE, ILLINOIS.

VELOCIPEDE.

SPECIFICATION forming part of Letters Patent No. 373,980, dated November 29, 1887.

Application filed August 16, 1887. Serial No. 247,133. (No model.)

*To all whom it may concern:*

Be it known that I, DAVID HORN, of Carterville, in the county of Williamson and State of Illinois, have invented a new and Improved Vehicle, of which the following is a full, clear, and exact description.

My invention relates to a vehicle of that class intended for propulsion by the occupant, and has for its object to provide an inexpensive and durable vehicle of this character which may be propelled at high speed on ordinary roads and may be readily steered in any direction.

The invention consists in certain novel features of construction and combinations of parts of the vehicle, all as hereinafter described and claimed.

Reference is to be had to the accompanying drawings, forming a part of this specification, in which similar letters and figures of reference indicate corresponding parts in the several views.

Figure 1:
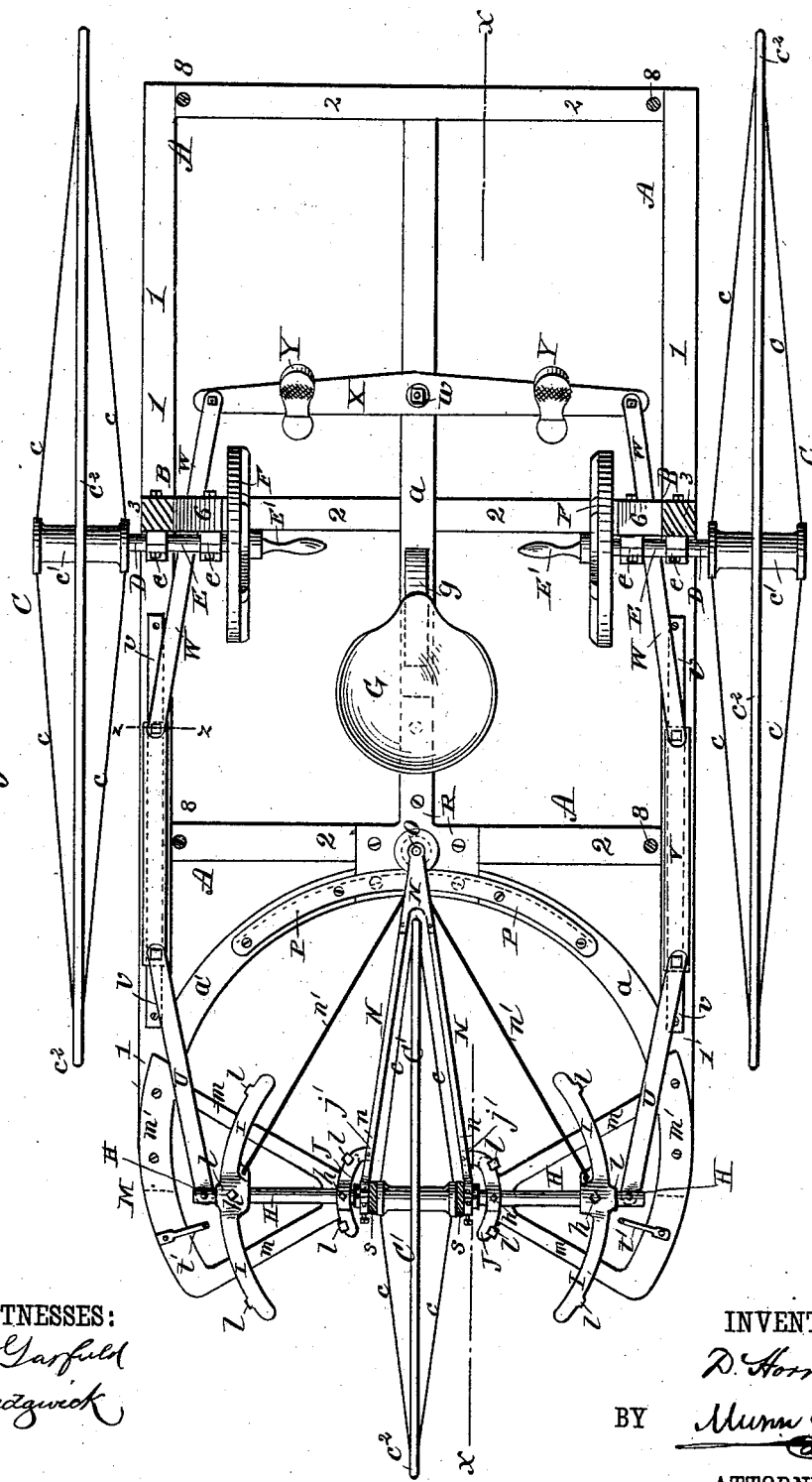
Figure 2:
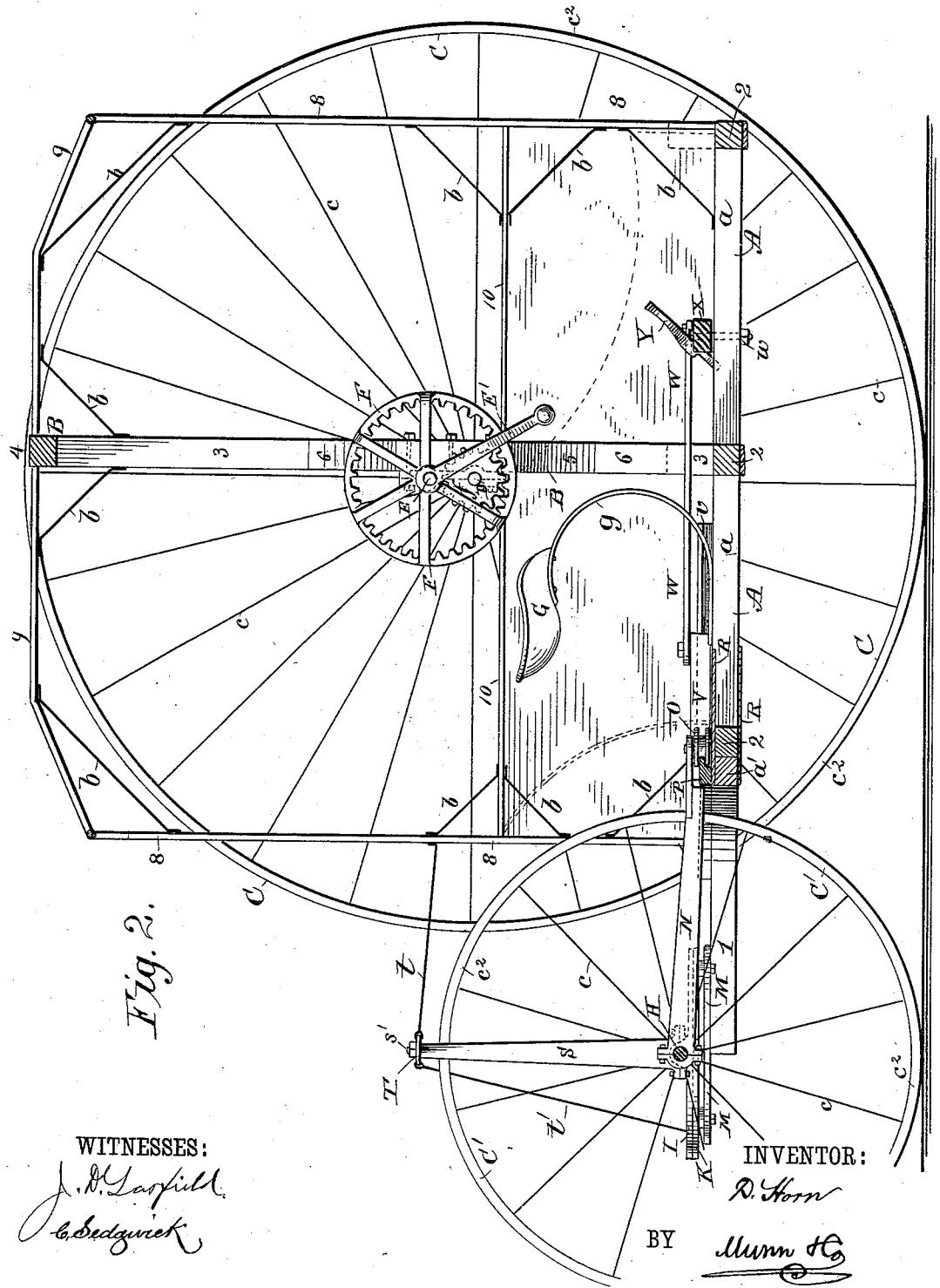

Figure 1 is a plan view of my improved vehicle with parts broken away and in horizontal section. Fig. 2 is a longitudinal section of the vehicle, taken on the line $x\,x$, Fig. 1, and partly broken away. Fig. 3 is a detail perspective view of the steering-wheel shaft and its supports at one side of the vehicle. Fig. 4 is a detail vertical section taken on the line $y\,y$ of Fig. 3. Fig. 5 is an enlarged transverse section taken on the line $z\,z$, Fig. 1; and Fig. 6 is an enlarged front view of portions of the vehicle-frame and one of the main wheels and its driving-gearing.

The body of the vehicle is provided with a bottom horizontal frame, A, which consists of side bars, 1 1, front, middle, and rear cross-bars, 2 2 2, and a longitudinally-ranging bar, $a$, and an upright frame, B, which consists of opposite side uprights, 3 3, fastened to the side bars, 1 1, of the frame A, and a top cross-bar, 4, connecting the upper ends of the uprights 3 3. The main wheels C C of the vehicle are each mounted on an axle, D, which is journaled in boxes $d\,d$, fixed to the adjacent upright 3 of the frame B, and to an inner vertically-ranging bar, 5, which is connected by inclined brace-bars 6 6 and also by stay rods or bolts 7 7 with the upright 3, thus providing for placing two boxes, $d\,d$, on the frame for the axle of each wheel.

On a shaft, E, journaled in boxes $e\,e$, held to the bars 3 5, a gear-wheel, F, having internal teeth, is fixed, and this wheel meshes with a pinion, $f$, which is fixed to the axle D, and whereby as a crank, E', fixed or applied to the shaft E, is turned by a person sitting on a seat, G, supported by an elastic plate or bar, $g$, from the bar $a$ of the frame A, the main wheel C will be rotated for driving the vehicle forward or backward at pleasure, it being understood that both wheels C C are geared alike with a crank, E', at each side of the machine. The cranks E' may of course be connected directly with the wheel-axles D, as indicated in dotted lines in Fig. 6, when the vehicle is not to be propelled at high speed.

It will be noticed that the two frames A B support the body of the vehicle on the two main wheels C C, and the frame A also supports the rear steering-wheel, C', of the vehicle, in a manner presently described.

Upon the frame A are supported upright rods 8, preferably four in number, and rising from the ends of the front and rear cross-bars, 2 2, and these rods 8 are connected at their tops by either curved or straight rods 9 with the top cross-bar, 4, of the frame B. A bar, 10, ranges along each side of the vehicle, and is connected to the frame B and to the side rods, 8, of the top frame.

A series of braces, $b$, stay the parts 8 9 10 to each other and to the frames A B, so that the whole forms a very light but strong vehicle-body frame, which will preferably be covered with canvas or any other suitable material to protect the person on the seat G from the sun, dust, or during inclement weather.

If desired, the top rods, 8 9, may be dispensed with, and the vehicle may be made with a low body, as indicated by the dotted lines in Fig. 2 of the drawings.

It will be seen that the weight of the person riding is carried entirely from a point below the axles of the wheels C C; hence the vehicle will be very steady and cannot be upset easily.

I purpose making the main wheels C C from seven to eight feet in diameter, and the steering-wheel C' from four to five feet in diameter, and each of the wheels will be made with very light spokes $c$, connecting the wheel-hub $c'$ with the wheel-tire $c^2$, and the hubs $c'$ of the wheels will preferably be made hollow to provide a chamber, $c^3$, to receive oil, and as will be understood from Fig. 6 of the drawings.

The steering-wheel C' is mounted loosely upon an axle, H, which passes through holes made in lugs $i\ j$, formed with or fixed to the tops and central parts of two pairs, I J, of top fifth-wheel plates, one pair being located on each side of the steering-wheel. Set-screws $h$ hold these upper plates, I J, securely to the axle H, or rather hold the axle to the plates, so that the plates turn with the axle in horizontal plane.

Under each of the plates I J are arranged corresponding lower fifth-wheel plates, K L. The plates K are secured by bolts $k$ to the front and rear parts, $m\ m$, of metal plates or frames M, the outer parts, $m'$, of which are bolted or otherwise secured to the rearwardly-projecting side parts, 1 1, of the frame A, washers $m^2\ m^2$ being interposed between the plates K and the frame. The inner lower fifth-wheel plates, L, are shown formed at and with the inner end parts of the frames M; but they may be made separately and be attached to the frames in any approved way.

There are two pairs of fifth-wheel plates, I J and K L, at each side of the steering-wheel, and one plate of each pair will be provided with hooks $l$, which lock at the outer face of the corresponding plate to hold each pair of plates together face to face and allow free movement of the upper plates on the lower ones. For the outer longer pairs of fifth-wheel plates, I J, these hooks $l$ are shown formed on the upper plates I, so as to underlap the lower plates K, as most clearly seen in Figs. 3 and 4 of the drawings, while for the inner pairs of plates, J L, the lugs $l$ are formed on the lower plates L, and overlap the upper plates J. There are three lugs $l$ on the longer plates I, and the center lug thereon forms a stop which, by contact with the two parts $m\ m$ of the frame M, limits the swing of the steering-wheel either way, while allowing it to be moved sufficiently to turn the vehicle around very quickly to either side.

To the axle H there are held, preferably by split boxes and set-screws, the inner ends, $n\ n$, of a forked arm, N, which ranges forward, and at its extremity is provided with a peripherally-grooved roller, O, which fits upon the forward edge of a curved metal plate, P, which is secured to a curved cross-bar, $a'$, which is held at opposite ends to the opposite side bars, 1 1, of the frame A, and at its center is held to the rear cross-bar, 2, and the center bar, $a$, of the frame A, by metal plates R R, bolted or screwed to the opposite faces of the parts $a'$, 2, and $a$, as shown in Figs. 1 and 2 of the drawings. Stay-rods $n'\ n'$ brace the rear end of the arm N, next the roller O, to the center parts of the opposite upper fifth-wheel plates I I; hence the arm N and roller O will move steadily around either way with the shaft H, the fifth-wheel plates I J, and the steering-wheel C'.

The forward ends of the fifth-wheel plates J J are bolted or otherwise secured at $j'$ to the opposite sides of the arm N, thereby giving the inner ends of the plates M M substantial support from the axle, the arm, and the fifth-wheel plates.

The steering-wheel revolves within the opening of the arm N or between its diverging side parts, as shown in Fig. 1.

A forked bar or post, S, is fitted by split boxes at the lower ends of its side parts, $s\ s$, upon the axle H, and on a pivot-pin, $s'$, at the top of the post S is fitted loosely a plate, T, from which two opposite brace or stay rods, $t\ t$, run to opposite sides of the vehicle-body frame, to which they are bolted, and two other stay-rods, $t'\ t'$, extend from the plate T and are bolted to the outer parts, $m'$, of the opposite plates M, which are fixed to the main-frame bars 1 1. The post S, which turns with the axle H and wheel C', is thus swiveled in the plate T, which is securely braced to relatively fixed parts of the vehicle.

To operate the steering-wheel C' for guiding the vehicle by the feet while it is being propelled by hand-power applied at the cranks E', I connect a couple of rods or bars, U U, to opposite ends of the axle H, and the opposite ends of the bars U U are connected pivotally to the rear ends of metal slides V V, which are fitted onto guide plates $v\ v$, fixed to the opposite side bars, 1 1, of the vehicle-frame A, and to the other ends of the slides V V are pivotally connected the rear ends of a couple of bars, W W, the forward ends of which are pivoted to the opposite ends of a treadle bar or lever, X, which is pivoted at $w$ to the frame-bar $a$, and is provided with plates Y Y, on which the person sitting on the seat G will place his or her feet. The slide-plates $v$ are preferably made with side grooves next the bottom to receive inbent lips formed on the slides. The plates $v$ will be held to the frame-bars $a'$ by flush-headed bolts $v'$, and the bars U W will be pivoted to the slides V by flush-headed bolts $v'$, all as most clearly shown in Fig. 5 of the drawings.

It is obvious that while the person on the seat G turns the cranks E' to propel the vehicle he may, by pressure on the foot-plates Y Y, swing the steering-wheel C' to turn or alter the course of the vehicle at pleasure, and a high speed of travel may be maintained over ordinary roads with entire safety, and with freedom from dust, rain, snow, and other inconveniences attending travel on ordinary velocipedes, such as bicycles, tricycles, and other vehicles of like general character.

Having thus fully described my invention, I claim as new and desire to secure by Letters Patent—

1. The combination, in a vehicle, of a body-frame having boxes $d$ at each side, axles D D, journaled in said boxes, main wheels C C, fixed to the axles, cranks adapted to rotate the axles and wheels, a seat, G, on the frame, metal plates M M, fixed to the rear ends of the frame A, fifth-wheel plates I K J L, arranged in pairs on the plates M M at each side of the vehicle and provided with guide and stop lugs $l$, an axle, H, held to the movable fifth-wheel plates I J, a steering-wheel, C', journaled on the axle H, bars U U, connected to the ends of said axle, slides V V, connected to the bars U U and fitted to guides on the frame A, bars W W, connected to the slides, a treadle-bar, X, pivoted on the frame and connected to the bars W W, a horizontal arm, N, connected to the axle H, a roller, O, journaled to the arm N, a track-plate, P, on the frame and to which the roller is adapted, a vertical arm, S, connected to the axle H, a plate, T, in which the arm S is swiveled, and brace-rods staying the plate T from the vehicle-frame, all arranged substantially as described, for the purposes set forth.

2. In a vehicle, the combination, with the bottom frame having side parts, 1 1, and a curved rear cross-bar, $a'$, and mounted on wheels, substantially as specified, of plates M M, fixed to the parts 1 1, fifth-wheel plates K L, held to the plates M M, fifth-wheel plates I J, fitted on the plates K L and provided with bored lugs $i\ j$, an axle, H, held in the lugs $i\ j$ at each side of the vehicle, retaining and stop lugs $l$, fitted on the pairs of fifth-wheel plates, a steering-wheel, C', loose on the axle H, a horizontal arm, N, on the axle and provided with a roller, O, a track-plate, P, on the frame cross-bar $a'$, and to which plate said roller is adapted, a vertical arm, S, on the axle, a plate, T, in which the arm S is swiveled, and braces staying said plate from the vehicle-frame, substantially as described, for the purposes set forth.

3. A vehicle constructed with a frame mounted on side wheels, a steering-wheel journaled on an axle adapted to turn bodily, a horizontal arm, N, held on said axle and provided with a roller, O, engaging a track on the frame, a vertical arm, S, on the axle, a plate, T, loose on said arm S, and brace-rods staying said plate from the vehicle-frame, substantially as described, for the purposes set forth.

4. In a vehicle, the combination, with a frame and body mounted on side wheels, of an axle, H, pairs of fifth-wheel plates I J K L, held to the frame and axle and to each other, and provided with guide and stop lugs $l$, substantially as herein set forth.

5. In a vehicle, the combination, with a body mounted on side wheels, and a steering-wheel journaled on an axle adapted to turn bodily on the frame, of guide-plates $v\ v$, held to the body-frame and provided with overhanging lips, slides V V, fitted to said plates by interlocking lips, a treadle-bar, X, pivoted to the body-frame, bars U U, connecting the steering-wheel axle and the slides V V, and bars W W, connecting said axle and the treadle-bar X, substantially as described, for the purposes set forth.

DAVID HORN.

Witnesses:
E. C. JONES,
J. S. JONES.